(12) United States Patent
Hua et al.

(10) Patent No.: US 12,192,653 B2
(45) Date of Patent: *Jan. 7, 2025

(54) IN-LINE CHROMATIC ABERRATION CORRECTION IN WIDE DYNAMIC RANGE (WDR) IMAGE PROCESSING PIPELINE

(71) Applicant: TEXAS INSTRUMENTS INCORPORATED, Dallas, TX (US)

(72) Inventors: Gang Hua, Katy, TX (US); Rajasekhar Reddy Allu, Plano, TX (US); Mihir Narendra Mody, Bengaluru (IN); Niraj Nandan, Plano, TX (US); Mayank Mangla, Allen, TX (US); Pandy Kalimuthu, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/343,018

(22) Filed: Jun. 28, 2023

(65) Prior Publication Data

US 2023/0336887 A1 Oct. 19, 2023

Related U.S. Application Data

(63) Continuation of application No. 17/555,145, filed on Dec. 17, 2021, now Pat. No. 11,743,612.

(51) Int. Cl.
*H04N 25/611* (2023.01)
*G06T 1/60* (2006.01)
(Continued)

(52) U.S. Cl.
CPC ............. *H04N 25/611* (2023.01); *G06T 1/60* (2013.01); *G06T 3/4015* (2013.01); *H04N 25/13* (2023.01)

(58) Field of Classification Search
CPC ........ H04N 25/611; H04N 25/13; G06T 1/60; G06T 3/4015; G06T 5/80; G06T 2207/10024

See application file for complete search history.

(56) References Cited

U.S. PATENT DOCUMENTS

| 5,113,247 A | * | 5/1992 | Akiyama | ............... H04N 23/15 348/263 |
| 7,142,238 B1 | * | 11/2006 | Sawada | ............. H04N 1/00013 348/335 |

(Continued)

*Primary Examiner* — Chiawei Chen
(74) *Attorney, Agent, or Firm* — Michael T. Gabrik; Frank D. Cimino

(57) ABSTRACT

In an advanced driver-assistance system (ADAS), RAW sensor image processing for a machine vision (MV) application is important. Due to different color, e.g., red/green/blue (RGB), color components, being focused by the lens at different locations in image plane, the lateral chromatic aberration phenomenon may sometimes be observed, which causes false color around edges in the final image output, especially for high contrast edges, which can impede MV applications. Disclosed herein are low-latency, efficient, optimized designs for chromatic aberration correction (CAC) components. An in-pipeline CAC design may be used to perform on-the-fly CAC without any out-of-pipeline memory traffic; enable use of wide dynamic range (WDR) sensors; uses bicubic interpolation; support vertical and horizontal chromatic aberration color channel offsets, reduce CAC line memory requirements, and support flexible look-up table (LUT) down-sampling factors to improve the spatial precision of correction and accommodate popular image sensor resolutions.

19 Claims, 5 Drawing Sheets

(51) Int. Cl.
   *G06T 3/4015*  (2024.01)
   *H04N 25/13*  (2023.01)

(56) References Cited

U.S. PATENT DOCUMENTS

| | | | | |
|---|---|---|---|---|
| 7,200,279 B1* | 4/2007 | Lin | ............... | H04N 9/646 |
| | | | | 345/589 |
| 7,339,699 B1* | 3/2008 | Suzuki | ............... | H04N 1/48 |
| | | | | 358/1.9 |
| 2002/0001409 A1* | 1/2002 | Chen | ............... | H04N 23/843 |
| | | | | 382/167 |
| 2007/0206852 A1* | 9/2007 | McGee | ............... | H04N 1/648 |
| | | | | 382/166 |
| 2009/0051828 A1* | 2/2009 | Brown | ............... | G09G 3/02 |
| | | | | 348/E3.04 |
| 2009/0297060 A1* | 12/2009 | Hattori | ............... | H04N 5/2628 |
| | | | | 382/286 |
| 2010/0091143 A1* | 4/2010 | Hara | ............... | H04N 25/611 |
| | | | | 348/E7.003 |
| 2010/0253850 A1* | 10/2010 | Cooper | ............... | G06Q 10/00 |
| | | | | 348/E9.055 |
| 2010/0265352 A1* | 10/2010 | Nashizawa | ............... | H04N 9/646 |
| | | | | 348/E5.022 |
| 2013/0010163 A1* | 1/2013 | Yamaguchi | ............... | H04N 25/134 |
| | | | | 382/167 |
| 2013/0278801 A1* | 10/2013 | Sawada | ............... | H04N 25/611 |
| | | | | 348/242 |
| 2013/0287297 A1* | 10/2013 | Matsuoka | ............... | H04N 25/134 |
| | | | | 382/167 |
| 2014/0270459 A1* | 9/2014 | Moll | ............... | G06T 7/269 |
| | | | | 427/256 |
| 2015/0296193 A1* | 10/2015 | Cote | ............... | H04N 23/843 |
| | | | | 382/167 |
| 2015/0348244 A1* | 12/2015 | Zimmer | ............... | G06T 5/20 |
| | | | | 382/167 |
| 2020/0005719 A1* | 1/2020 | Martin | ............... | G06F 3/012 |
| 2021/0321065 A1* | 10/2021 | Wu | ............... | H04N 25/68 |
| 2022/0215506 A1* | 7/2022 | Wu | ............... | G06T 3/4007 |

* cited by examiner

IN-LINE CHROMATIC ABERRATION CORRECTION IN WIDE DYNAMIC RANGE (WDR) IMAGE PROCESSING PIPELINE

CROSS-REFERENCE TO RELATED APPLICATION(S)

This application is a continuation of, and claims the benefit of priority under 35 U.S.C. § 120 on, U.S. application Ser. No. 17/555,145, filed Dec. 17, 2021, the content of which is incorporated by reference herein.

BACKGROUND

In photography, particularly with RAW images, different artifacts can affect the quality of the edges of objects appearing in the captured images. This effect is sometimes more noticeable when an edge has high contrast, which can cause a phenomenon known as "color fringing" or "chromatic aberration" (CA) to be present in the image. Color fringing can cause false colors, such as purple or green, to appear around such high contrast edges in the captured images. In repairing such a color "fringe" region, it is sometimes effective to merely diminish the noticeability of the fringe, e.g., through chroma replacement with nearby values, desaturation, or by other means. However, not all pixels of an image necessarily display color fringing artifacts. For example, fringing typically occurs more prominently towards the outer edges of a camera's field of view (FOV).

In certain cases, e.g., in the field of high-volume advanced driver-assistance systems (ADAS) systems, low-cost lenses that exhibit significant CA (and, in particular, lateral CA, or "LCA") are often employed. False color edges caused by LCA may be undesirable to viewers in Human Vision (HV) ADAS systems. Machine Vision (MV) algorithms also often require highly-accurate color output and are therefore very sensitive to color artifacts caused by LCA. Moreover, in such systems, support for WDR image data, low latency, reduced memory traffic, and optimized on-chip area design may also be considerations in the implementation of an image processing pipeline with in-line CAC.

SUMMARY

This disclosure pertains to systems, methods, and devices for image processing. In general, techniques are disclosed for performing chromatic aberration correction (CAC) on RAW image data, and especially on wide dynamic range (WDR) image data, e.g., in the advanced driver-assistance systems (ADAS) field, wherein RAW sensor image processing for machine vision (MV) applications can be of critical importance.

In an example, an electronic device comprises a color separator, first and second cache memories coupled to the color separator, an interpolator coupled to the second cache memory, and a merge component coupled to the first cache memory and the interpolator. The color separator is configured to separate an image into a first color component having a first set of pixels and second color component having a second set of pixels. The first cache memory is configured to store values of the first set of pixels, and the second cache memory is configured to store values of the second set of pixels. The interpolator is configured to perform interpolation on the values of the second set of pixels, wherein the interpolation is performed based on an estimated amount of shift in the respective position of each value of the second set of pixels caused by chromatic aberration (CA). The merge component is configured to merge the interpolated values of the second set of pixels and values of the first set of pixels. The electronic device is configured to produce a CA-corrected version of the image based on the merged interpolated values of the second set of pixels and the values of the first set of pixels.

In an example, the color separator, the first and second cache memories, the interpolator, and the merge component are embodied in a chromatic aberration correction (CAC) component. In an example, the image is a Wide Dynamic Range (WDR) image having a dynamic range of 16 bits or more, which may be obtained by a WDR image sensor. The image sensor may use a Bayer filter or other types of color filter arrays, such as RCCB.

In an example, performing the interpolation may include estimating an amount of shift in the respective position of each first color (e.g., green) value caused by CA, such as by utilizing a two-dimensional (2D) look-up table (LUT) storing a plurality of pixel shift values (e.g., signed horizontal and vertical pixel shift values). In some such embodiments, it may be desirable for the pixel shift values stored in the LUT to be evenly-sampled (or nearly evenly-sampled) across the extent of the image sensor. In some such embodiments, the 2D LUT is capable of storing the plurality of pixel shift values at a plurality of different down-sampling factors with respect to a resolution of the image obtained from the image sensor and, e.g., based on the amount of internal memory available to the CAC component to use for the LUT storage.

In an example, the image may be obtained, separated, interpolated, and merged by the CAC module on a pixel line-by-line basis, i.e., in a "streaming" or "on-the-fly" manner, rather than waiting until the data for the entire captured image is received to begin the CAC processing. In some such embodiments, a set number of lines of pixels are buffered in internal memory of the CAC module for usage in the interpolation operation, e.g., based on the maximum amount of estimated pixel shift that may be caused by CA for a given lens.

In an example, an image processing pipeline comprises a front-end image processor configured to receive an input image and perform image processing on the input image to generate a formatted image; a chromatic aberration correction (CAC) component coupled to the front-end image processor and configured to perform chromatic aberration (CA) correction to generate a CA-corrected version of the formatted image; a post-CAC processing component coupled to the CAC component and configured to process the CA-corrected version of the formatted image to generate a processed image; a first color processor directly coupled to the post-CAC processing component and configured to generate a first color processed image based on the processed image; a second color processor directly coupled to the CAC component and configured to generate a second color processed image based on the CA-corrected version of the formatted image; and an output component directly coupled to each of the first color processor and the second color processor and configured to combine the first and second color processed image to generate an output image. The CAC component is configured to separate the formatted image into a first color component having a first set of pixels and second color component having a second set of pixels, perform interpolation on values of the second set of pixels based on an estimated amount of shift in the respective position of each value of the second set of pixels caused by chromatic aberration (CA), merge the interpolated values of the second set of pixels and values of the first set of pixels, and output the CA-corrected version of the formatted image based on the merged interpolated values of the second set of pixels and values of the first set of pixels.

BRIEF DESCRIPTION OF THE DRAWINGS

For a detailed description of various examples, reference will now be made to the accompanying drawings, in which.

The same reference number is used in the drawings for the same or similar (either by function and/or structure) features.

DETAILED DESCRIPTION

Often, so-called "color fringing" in captured images is confused with noise in the captured color image signal. Color fringes are, in fact, distinct and come from different sources than color image signal noise. More specifically, the primary causes of color fringing are the various forms of chromatic aberration (CA), such as lateral CA and axial CA, which will now be described in greater detail.

Lateral CA

As mentioned above, LCA may cause the appearance of "false color" regions in the final output version of a captured image, e.g., around edges, and especially high contrast edges. Lateral CA may occur in captured images when the RGB image components are focused by the lens at different locations in image plane (e.g., due to dispersion properties of the light at different wavelengths). The amount of spatial offset or "shift" between corresponding pixels in the green (G), red (R), and blue (B) color channels is also spatially-varying across the extent of the lens' field of view (FOV). Thus, as will be explained in further detail herein, in some implementations, the amount of shifting needed for the various color channels to compensate for LCA may be specified numerically and stored in a memory accessible to the image signal processing pipeline, e.g., in a table, such as a two-dimensional (2D) look-up table (LUT).

It is possible to approximately cancel lateral CA, e.g., by characterizing the lens and utilizing the metadata concerning the lens settings to predict the amount of shifting that may occur in a given color channel. For example, owing to the fact that most image sensors (e.g., Bayer pattern image sensors) have a greater number of green photosites than either red or blue photosites, and owing to the fact that the green channel is the best approximating channel to the luminance of the color of a given pixel, the green channel from the image data often represents the closest approximation of the true position of the edges in a captured image. Thus, the red and blue channels may be shifted, so the red and blue edges more closely match the corresponding green edges.

To accomplish these shifts, horizontal and vertical offsets (e.g., in the form of distortion vectors) may be determined for each pixel that provide the amount (and direction) of shift needed for the red channel and the amount of shift needed for the blue channel. Then, the captured red and blue channel color data around the determined shifted locations may be interpolated to produce the estimated red and blue color at the current pixel location. This interpolation operation may introduce some softening in the red and blue channels, but it can also reduce undesirable color fringing on high-contrast edges.

Figure 1:
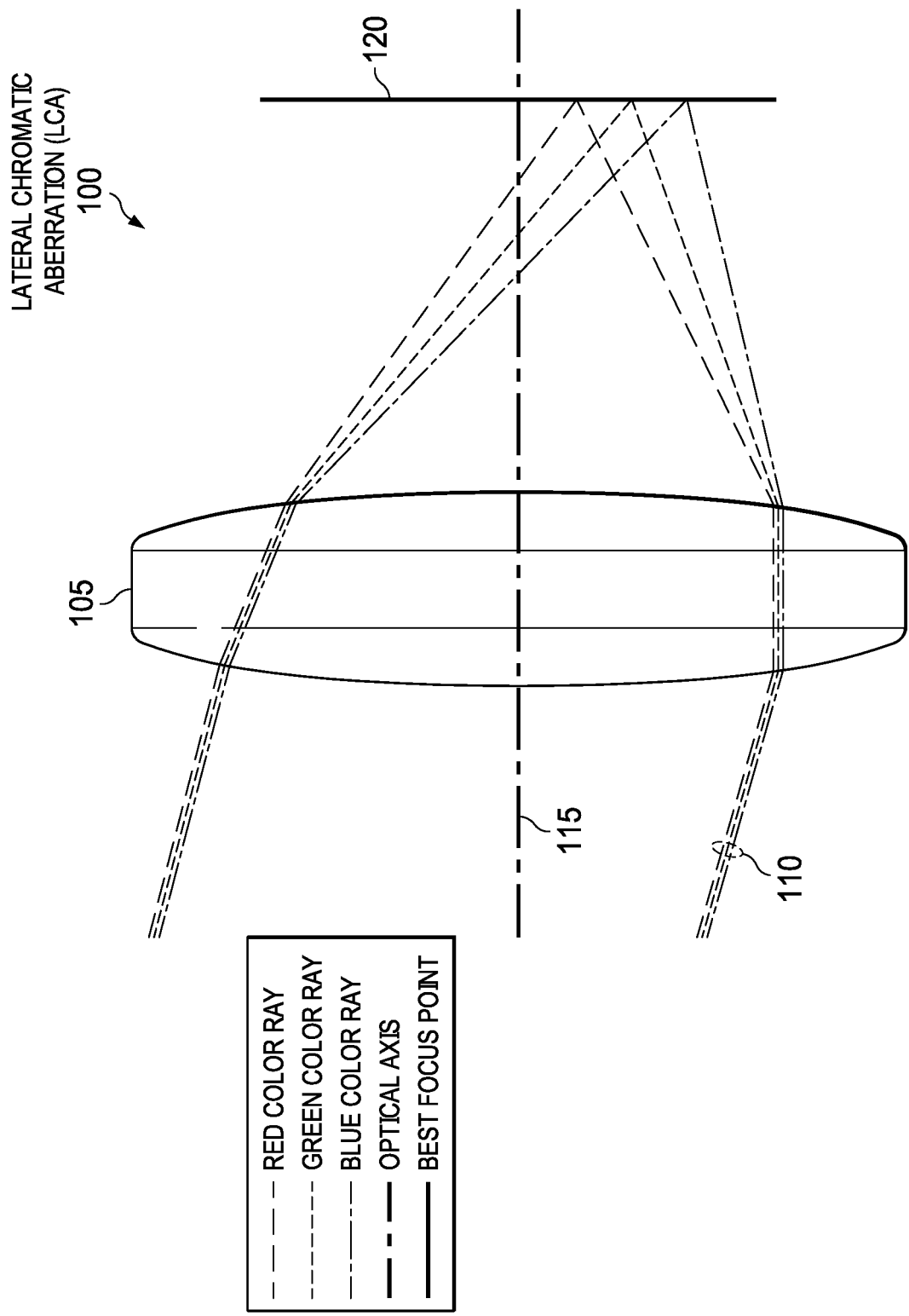
FIG. 1 illustrates an example of lateral chromatic aberration (LCA)

FIG. 1 shows an example of lateral chromatic aberration 100. Incoming light rays 110 enter convex lens 105, as shown in FIG. 1. The various red, green, and blue components of incoming light ray 110 are shown in the LEGEND of FIG. 1. As shown in FIG. 1, the best focus point 120 in this example of lateral CA occurs below the optical axis 115 of lens 105. At the best focus point 120, the red, green, and blue color rays have separated from each other, resulting in lateral CA.

Axial CA

While lateral CA is most visible towards the edges and corners of an image, axial CA can occur in any area where there is an edge across which a large depth difference occurs. With lateral CA, often one side of an object has a different color fringe from the other side. With Axial CA, the color of the fringe is dependent primarily upon the dark side of the edge and its relation to the plane of optimal focus. Axial CA can cause bright highlights to have purple or green fringes, depending upon on which side of the focal plane the object is in focus. Axial CA cannot be as easily geometrically cancelled as lateral CA (e.g., using shift vectors), because it depends upon the distance to the objects in the scene.

Image Processing Pipelines

Figure 2:
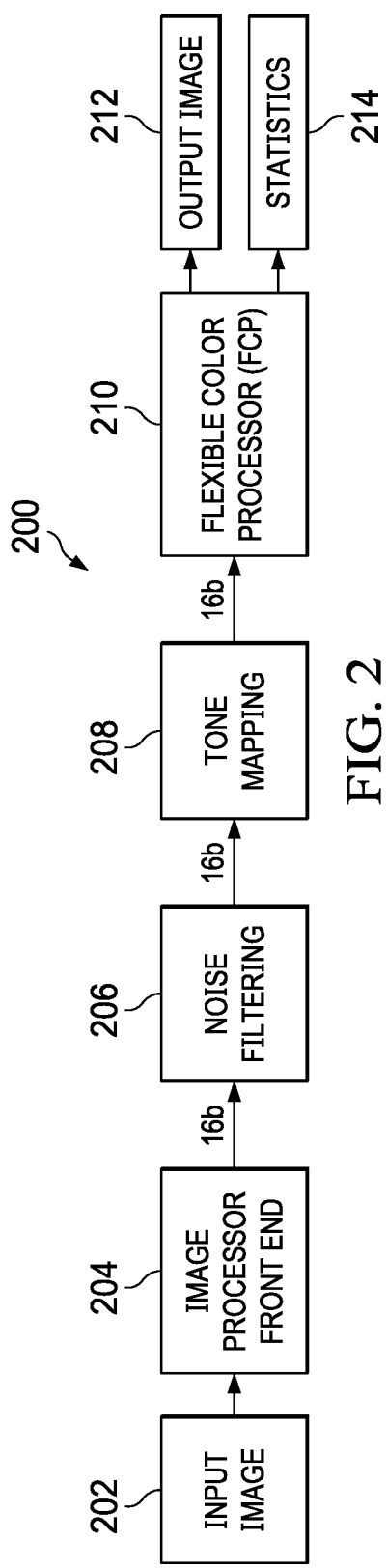
FIG. 2 illustrates an example image processing pipeline without chromatic aberration correction (CAC)

Turning now to FIG. 2, an example image processing pipeline without CAC 200 is illustrated. At the start of pipeline 200, an input image 202 may be obtained, e.g. in the form of RAW image data captured by an image sensor that is a part of (or in communication with) the same system or device that the image processing pipeline is implemented in. In some implementations, the input images may comprise, e.g., 12-bit or 16-bit RAW sensor images that are companded (i.e., compressed, as needed) from, e.g., 20-bit or 24-bit linear WDR images. The image processing pipeline may support any RAW image bit depth or in-pipeline bit depth that is desired for a given implementation, as well as any color filter array (CFA) pattern, i.e., including CFA patterns other than a standard Bayer RGGB color pattern, which will largely be discussed herein, or an RCCB color pattern (where 'C' refers to a "clear" or "white" pixel photosite), etc.

Next, an image processing front end module 204 may be applied to the input image data 202. The front end module 204 may, e.g., convert RAW sensor image data to a 16-bit gamma-corrected format, which can make it easier to perform lens shading correction (LSC) and/or white point (WP) adjustment downstream in the pipeline. If so desired, various image statistics may be computed for the processed RAW image data, e.g., information to be used in downstream Auto White Balance (AWB), Auto Exposure (AE) and/or Auto Focus (AF) operations.

Next, a noise filtering module 206 may be applied to the input image data to reduce spatial noise in the image data. Next, the image data may be processed by a tone mapping module 208, which may, e.g., comprise performing various global and/or localized brightness, contrast enhancement, or other desired forms of tone mapping operations on the noise-reduced image data. In some implementations (as indicated in FIG. 2), the processing operations may result in 16-bit image data with compressed Dynamic Range (DR).

Next, at block 210, a flexible color processor (FCP) may take the processed image data and produce a final output image 212 in a desired color format. For example, in some implementations, FCP 210 may comprise a processor in communication with one or more stored LUTs that are configured to convert a 16-bit output of tone mapping module 208 down to a 12-bit representation with a gamma correction that is inverse to the encoding of the input image 202. As such, the output of FCP 210 may comprise a tone-mapped (and relatively linear) 12-bit output image 212, i.e., the R:G:B ratio in the output image 212 will be relatively the same as in the original linearized input image 202 captured by the image sensor. The output image 212 format may be in any desired color format, e.g., standard 12-bit YCbCr, 8-bit RGB, 8-bit YCbCr, or 8-bit color saturation values, etc. If desired, various image statistics 214, e.g., color or luminance histograms, and the like, may be also be computed and/or stored for the output image data.

As may now be appreciated, the example image processing pipeline 200 in FIG. 2 does not support in-pipeline CAC for WDR image sensors. Other prior approaches to CAC may have performed the CAC as pre-processing step on the RAW image data before the image data entered image processing pipeline, resulting in a large number of memory-to-memory operations and heavy main memory (e.g., RAM) read/write traffic, which can result in significant latency and the inability (or infeasibility) of operating on entire WDR images, which can be quite large in size, due to their large bit-depth. Thus, discussion will now turn to improved image processing pipelines, e.g., pipelines with in-line, memory-efficient, and low-latency CAC for WDR images.

Image Processing Pipelines with In-Line CAC

Figure 3:
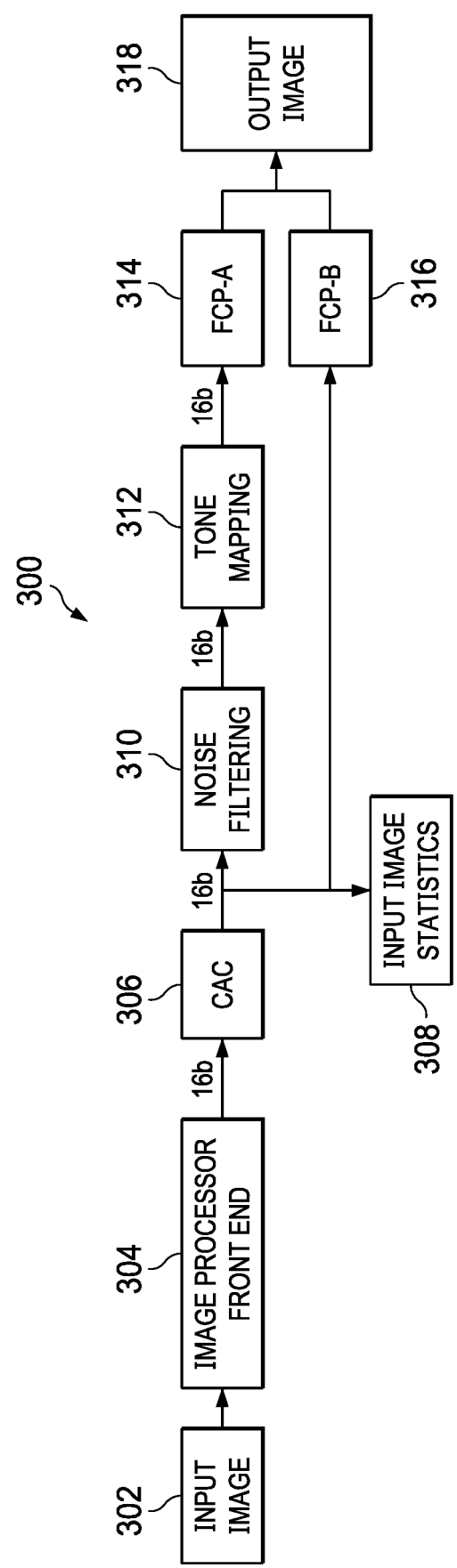
FIG. 3 illustrates an example image processing pipeline with an in-line CAC module, in accordance with aspects of the present disclosure.

Turning now to FIG. 3, an example image processing pipeline 300 with an in-line CAC module 306 is illustrated, in accordance with aspects of the present disclosure. As described above with reference to FIG. 2, the image processing pipeline 300 may begin by obtaining an input image 302 in a desired format, and then perform any desired front-end image processing on the RAW data at front end module 304, e.g., converting the RAW sensor image data to a 16-bit gamma-corrected format. If so desired, various image statistics may be computed for the processed RAW image data, e.g., information to be used in downstream AWB, AE, and/or AF operations.

Next, the in-line CAC module 306 may be applied to the image data to perform chromatic aberration correction operations on the incoming data. According to some embodiments, the CAC may comprise an "on-the-fly" or "line-by-line" correction operation that removes or mitigates chromatic aberration artifacts in the captured images without any memory traffic to a main system memory or other source of external or "off chip" memory. In some embodiments, input image statistics 308 may also be calculated based on the CA-corrected image data, e.g., color or luminance histograms, and the like, may be also be computed and/or stored for the output image data. As described above with reference to FIG. 2, the image processing pipeline 300 may proceed by applying desired noise filtering (310) and or tone mapping (312) modules to the processed data.

Finally, the CA-corrected, noise-reduced, and tone-mapped image data may be sent to a first FCP (i.e., FCP-A 314), while another copy of the CA-corrected image data (e.g., without noise reduction/tone mapping) may concurrently be sent to a second FCP (i.e., FCP-B 316) to be processed (and combined, as desired) to produce a final CA-corrected output image 318. For example, in some embodiments, a first FCP-A 314 may be used to process color image information for Human Vision (HV) applications (e.g., video images shown on display devices for human observers) and the parallel second FCP-B 316 may be used to process color image information for Machine Vision (MV) applications (e.g., video images intended for further machine analysis, rather than display to human observers). The input of FCP-B may be configured to receive the output of various modules in the image processing pipeline 300, as is needed for a particular implementation, e.g., from modules 304, 306 (as illustrated), 310, or 312.

In other embodiments of image processing pipeline 300 (not pictured), additional processing blocks and/or modules may also be part of the image processing pipeline, e.g., in order to adjust color formats, match data precision in the pipeline, account for non-gamma-corrected data, convert between linear and non-linear data formats, apply color correction matrices (CCM), adjust color channel gains and offsets, suppress CFA-specific artifacts, encode the output image data with a desired DR and/or bit-depth, and the like.

Figure 4:
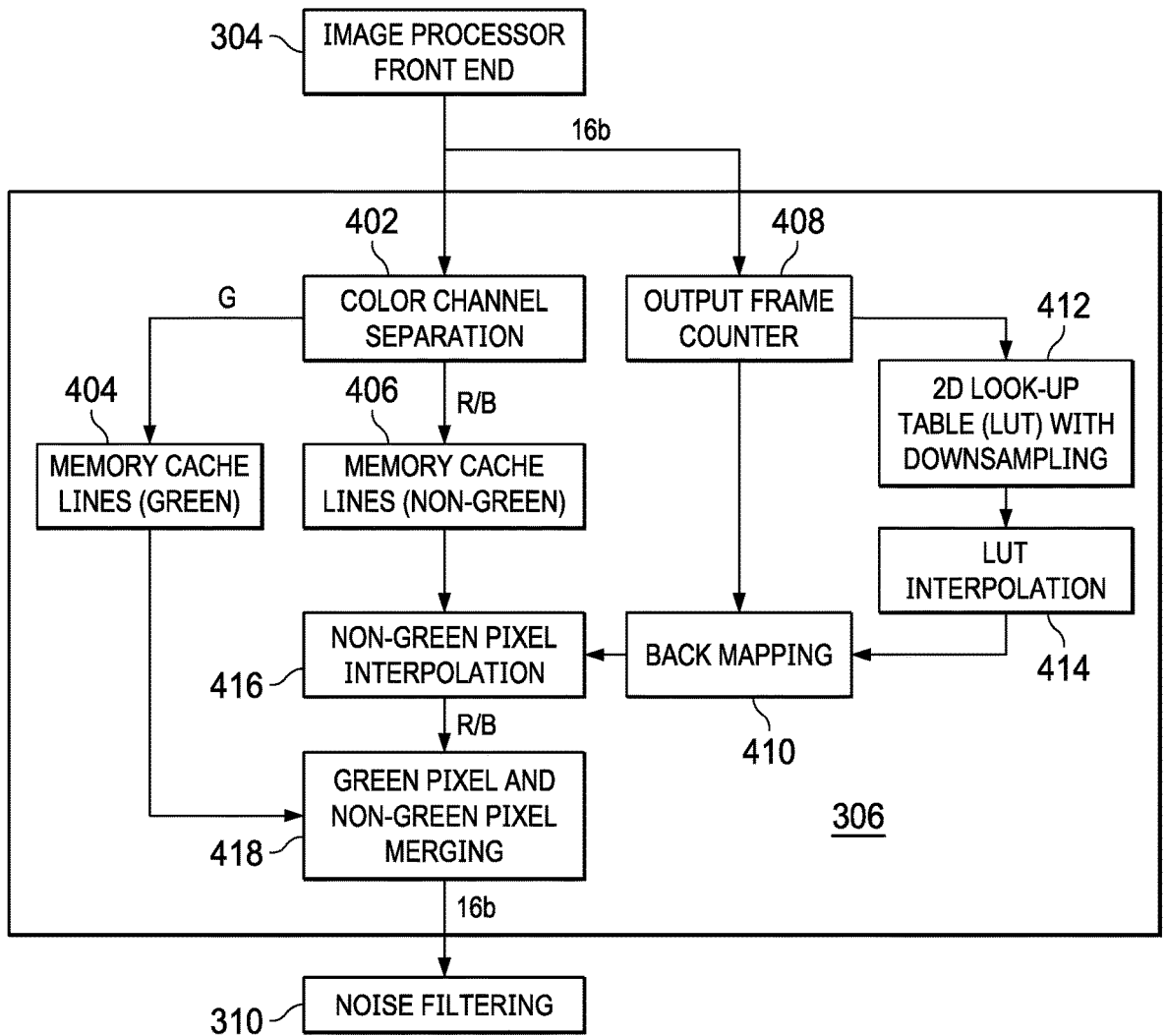
FIG. 4 illustrates an example in-line CAC module in block diagram form, in accordance with aspects of the present disclosure.

Turning now to FIG. 4, the example in-line CAC module 306 from FIG. 3 is illustrated in greater detail in block diagram form, in accordance with aspects of the present disclosure. As illustrated, image data, e.g., gamma-corrected or other types of compressed 16-bit image data, enters the CAC module 306 (e.g., in a pixel line-by-line fashion) and is processed by color channel separation module 402. In the example illustrated in FIG. 4, the image data is separated by color channel separation module 402 and stored in cache memory, e.g., in the form of both green color channel values (404) and non-green color channel values (406), i.e., red and blue color channel values, in the case of an RGB sensor.

As the incoming image data is being sent to color channel separation module 402, output frame counter 408 may be used to track the locations (e.g., in x-y coordinates) of each pixel in the image frame. This output pixel counter information may then be used to address and extract the appropriate pixel shift values, e.g., as stored in a table, such as 2D LUT 412, and which are to be used in the performance of interpolation operations on the non-green color channels of values. The 2D LUT 412 may store, for each of a set of pixel locations across the image sensor (wherein the number of entries in LUT 412 is based on, e.g., a selected downsampling factor for the available lens LCA pixel shift information), a needed amount (and direction) of horizontal and/or vertical shifting that should be applied to the non-green color channels of values due to LCA, i.e., in order to make them align more closely with the corresponding green color channel values. The pixel shift values stored in LUT 412 may be based on, e.g., the lens characteristics and metadata of the lens. In some cases, the LUT 412 will store a preset number of pixel shift values, e.g., at least a 32×32 array of grid points (i.e., 1,024 table entries) that may be sampled based on a given input pixel's location within the input image. According to some embodiments, users may employ various downsampling options for the pixel shift values written into LUT 412, such as a 4×4, 8×8, or 12×12 downsampling of the available lens LCA pixel shift information. As will be explained herein, in some implementations, a downsampling factor for LUT 412 may be selected, such that the resulting number of grid point samples of pixel shift values that are to be stored in the 2D LUT can fit into the (often quite limited) on-chip memory that is available. Preferably, the grid points of pixel shift values may be evenly-sampled in the horizontal and vertical directions, so that there is adequate coverage of the predicted pixel shift due to LCA over all portions of the lens. As may be understood, 2D array sizes of larger (or smaller) than 32×32 may also be employed in a given implementation, e.g., based on the image sensor size used, the acceptable amount of spatial precision loss in pixel shift values due to the downsampling, and/or the amount of on-chip memory available in the given implementation. For example, a 55×32 array of grid points (i.e., 1,760 distinct table entries of pixel shift values, which may, themselves, each comprise a signed 8-bit horizontal shift value and a signed 8-bit vertical shift value for each of the non-green color channels) may be stored in LUT 412 for image sensors that have closer to a 16:9 aspect ratio. Larger image sensor sizes may require even greater numbers of grid points to adequately sample the image sensor. At LUT interpolation block 414, the array of grid points storing pixel shift values may be interpolated, e.g., using bilinear interpolation or any other desired form of interpolation, in order to determine appropriate pixel shift values (e.g., both horizontal and vertical shift values) for the exact location (e.g., as tracked by output frame counter 408) of the current non-green input pixel that is being evaluated by the CAC module.

At back mapping module 410, the determined non-green color channel shift values for the non-green pixel currently being evaluated (e.g., as determined via LUT interpolation at block 414) are used to identify the relevant non-green pixels from the pixel lines stored in the non-green color channel cache 406. As may be understood, the number of lines of pixels that need to be buffered in memory cache depends on the particular lens being used in a given implementation. For example, if the quality and characteristics of a lens being used in a given implementation indicate that there may be up to 7 rows of vertical "shift" for a given pixel due to the effects of chromatic aberration, then 14 rows of pixel values may need to be buffered (e.g., 7 rows above the row of the current pixel and 7 rows below the current pixel) in order for the necessary non-green color channel pixel values to be available for the non-green color channel pixel interpolation operation at block 416. If, instead, the quality and characteristics of a lens being used in a given implementation indicate that there may be up to only 3 rows of vertical "shift" for a given pixel due to the effects of chromatic aberration, then only 6 rows of pixel values may need to be buffered (e.g., 3 rows above the row of the current pixel and 3 rows below the current pixel), and so forth.

It is to be understood that a maximum possible horizontal shift may also be determined for a given implementation (e.g., 4 columns to the left of the current pixel and 4 columns to the right of the current pixel), i.e., to define the bounds and set the timing of the interpolation operations to be performed for a given pixel, but, because the entire row of pixel values is already buffered in the cache memory as part of the buffering for the maximum possible vertical shifting due to CA, then all pixels from a given row will already be available for any necessary horizontal shifting of values due to CA, thus, no additional rows of pixel values need to be cached by the system to account for the maximum possible horizontal shifting due to CA.

At block 418, the cached green pixel values (i.e., from green color channel cache 404) and the newly-interpolated (and appropriately shifted to account for CA) non-green pixel values from block 416 may be merged together to reconstruct a line of CA-corrected pixel color values, which are ultimately output to the next module of the image processing pipeline, e.g., noise filtering module 310 in the examples illustrated in FIGS. 3 and 4. As may now be understood, a sufficient number of lines of green pixels (e.g., 6 rows above the row of the current pixel) may also need to be stored in the green color channel cache 404, such that the appropriate green color channel pixel values may be merged (e.g., interleaved) with the appropriate interpolated non-green color channel pixel values at block 418, i.e., once the non-green pixel interpolation operations have been completed at block 416.

Thus, assuming the use of a typical Bayer filter with the image sensor (i.e., with a BGGR pattern), the pixel values output by CAC module 306 in a given implementation may comprise the following pattern:

Line 1: $B1_{shifted/interpolated}$, G1, $B2_{shifted/interpolated}$, G2, $B3_{shifted/interpolated}$, G3, and so forth to the end of the line of pixels, followed by:

Line 2: G1, $R1_{shifted/interpolated}$, G2, $R2_{shifted/interpolated}$, G3, $R3_{shifted/interpolated}$, and so forth, until reaching the final line of pixels in an input image.

Figure 5:
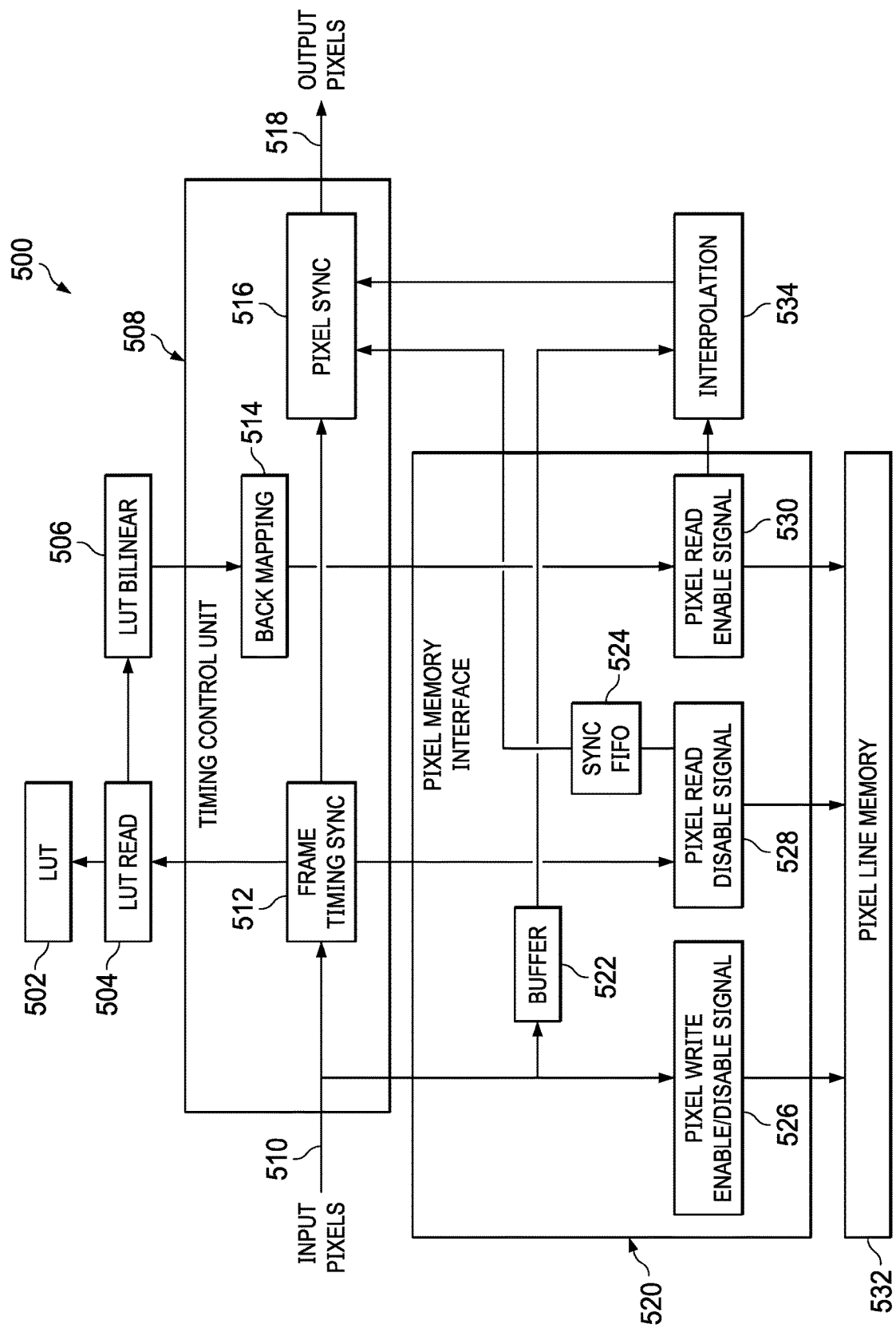
FIG. 5 illustrates further details of an example in-line CAC module in block diagram form, in accordance with aspects of the present disclosure.

Turning now to FIG. 5, further details of an example in-line CAC module 500 are illustrated in block diagram form, in accordance with aspects of the present disclosure. As described above, in order for the CAC module to operate in a memory-efficient and in-line fashion with the rest of the image processing pipeline, a streaming architecture may be employed that buffers incoming pixel lines to the extent needed based on a maximum potential pixel shifting distance to correct for CA, and then synchronizes the output of the CA-corrected pixel values, so that each line of CA-corrected pixel values is output in the correct order and in a streaming fashion, while limiting the total amount of on-chip memory needed during the CAC operation.

FIG. 5 illustrates a CAC module 500 having a data flow from left to right, wherein input pixel values from interface 510 are streamed in at the left-hand side of FIG. 5, and output pixel values are streamed out at output pixel interface 518 on the right-hand side of FIG. 5. As described above with reference to LUT 412 in FIG. 4, LUT 502 may comprise a 2D LUT storing an array of grid points (preferably evenly-spaced grid points sampled over the extent of the image sensor), with each grid point having pre-determined CA correction pixel shift values (e.g., signed horizontal and vertical shift values) for the corresponding location on the image sensor, indicating how far (and in which direction) the "true" pixel color values for a given image sensor location have likely been shifted by the effects of CA relative to the corresponding green color channel pixel values. In some implementations, the LUT 502 may comprise a fixed amount of internal memory, e.g., 4 kilobytes (kB), 8 kB, 16 kB, or the like, that may be selected to be a balance between being able to store a sufficiently dense sampling of CA pixel shift value grid points over the image sensor (e.g., at least a 32×32 grid of sampled points) and not occupying too much die area on the chip with on-board memory.

As shown in FIG. 5, CAC module 500 may further comprise a LUT Read hardware module 504 configured to read out the sampled CA shift values from LUT 502, as well as a LUT Bilinear interpolation module 506 configured to do bilinear interpolation on the LUT values in order to approximate an even more accurate shift value for a given pixel's location. Recall that, because the array of grid points in LUT 502 may represent a downsampling of the image sensor's dimensions by a factor of, e.g., 8, 12, 16, 20, 24, 28, 32, 36, . . . , 128, etc., the pixel shift values associated with a given grid point in LUT 502 may actually represent a region of hundreds (or thousands) of pixels on the image sensor, so performing bilinear interpolation allows for more accurate pixel shift values to be determined for image pixels that lie in between the sampled grid points for which values are stored in LUT 502. By selecting an appropriate downsampling factor for the resolution of a given image sensor, it may be ensured that the on-chip memory available for the LUT is used efficiently, e.g., using at least 80% of available on-chip LUT memory to store the pixel shift values for the array of grid points. In some implementations, an additional small LUT may be used to perform reciprocal operations and support the more flexible number of downsampling factors (e.g., the aforementioned downsampling factors of 8, 12, 16, 20, 24, 28, 32, 36, . . . , 128, etc.).

As mentioned above, in order for the CAC module to operate in an in-line fashion with the rest of the image processing pipeline, a streaming architecture may be employed that buffers incoming pixel lines. Turning now to timing control unit 508, a frame timing sync module 512 may be used as a timing synchronizer to ensure that pixels from the correct lines of input image pixels are used in the ensuing interpolation operations. Pixel synchronization module 516 may then be used to merge back the non-interpolated (e.g., green) and interpolated (e.g., red and blue) CA-corrected pixel values in the correct order for placement onto the output pixel interface 518.

Turning now to the pixel memory interface 520 in FIG. 5, the input pixels may be added to a buffer 522. Buffer 522 may comprise, e.g., a circular buffer, to which the current line of pixel values may be added, along with the aforementioned predetermined number of other pixel lines that may need to be held in buffer memory, in order to accommodate the maximum possible pixel shift values that may be used when identifying the pixel values to include in the interpolation operation at block 534 for a given non-green color channel input image pixel.

Pixel memory interface 520 may further comprise: a pixel write enable/disable signal 526 (i.e., to indicate when a given input image pixel, whether it be a green/non-interpolated pixel or a non-green/interpolated pixel, needs to be written to pixel line memory 532); a pixel read disable signal 528 (i.e., to indicate when a given green/non-interpolated input image pixel needs to be read, e.g., in alignment with signaling from frame timing sync module 512, e.g., for synchronization at block 524 and eventual merger at block 516 for placement onto the output pixel interface 518); and a pixel read enable signal 530 (i.e., to indicate when a given non-green/interpolated input image pixel needs to be read, e.g., in alignment with signaling from frame timing sync module 512, for interpolation and eventual merger at block 516 for placement onto the output pixel interface 518).

As alluded to above, according to some implementations, a first-in first-out (FIFO) synchronization block 524 may be used, e.g., to delay the disabled (i.e., non-interpolated) pixel read data and allow it to align properly with the enabled (i.e., interpolated) pixel read data. As may now be appreciated, interpolated pixel data will experience additional cycle delay (i.e., while the downstream lines of pixel data are being read into the CAC module to obtain the neighboring pixel values and then while the interpolation calculations themselves are being performed to determine the shifted and interpolated pixel values), and FIFO synchronization block 524 may be used to add that additional delay time on to the read out of the disabled (i.e., non-interpolated) pixel data, i.e., so that the CA-corrected pixel data is interleaved and merged in the correct order at block 516 for placement onto the output pixel interface 518.

As described above with reference to back mapping module 410 of FIG. 4, the back mapping module 514 may take the output of LUT Bilinear interpolation module 506 and use it to enable the reading of the determined non-green color channel pixel values (e.g., via the activation of pixel read enable signal 530) that will be used in the interpolation operation at block 534. In some implementations, the interpolation operation performed at block 534 may comprise a bicubic interpolation operation, e.g., interpolating between the neighboring pixel values (e.g., a 3×3, 5×5, or 7×7 neighborhood of pixels) around the determined shifted location for a given non-green color channel pixel.

In some implementations, the bicubic interpolation operations may be performed on the aforementioned 16-bit non-green color channel values that are read into the CAC module 500 at the input pixel interface 510. In still other implementations, further efficiencies may be gained, e.g., by taking advantage of the fact that pixels at the extreme offsets of the interpolation neighborhood (e.g., the farthest away row or column from the current pixel's location) may be assigned a bi-cubic coefficient value of zero, and thus do not need to be buffered or stored in internal memory. Such an optimization may save up to an additional 15% in memory usage. Moreover, by separating the green color channel from the non-green color channels (e.g., red and blue color channels), as described above, and not performing shifting operations or interpolation operations on the green color channel pixel values, the amount of internal memory needed in the CAC module may be further reduced by up to an additional 25%.

Figure 6:
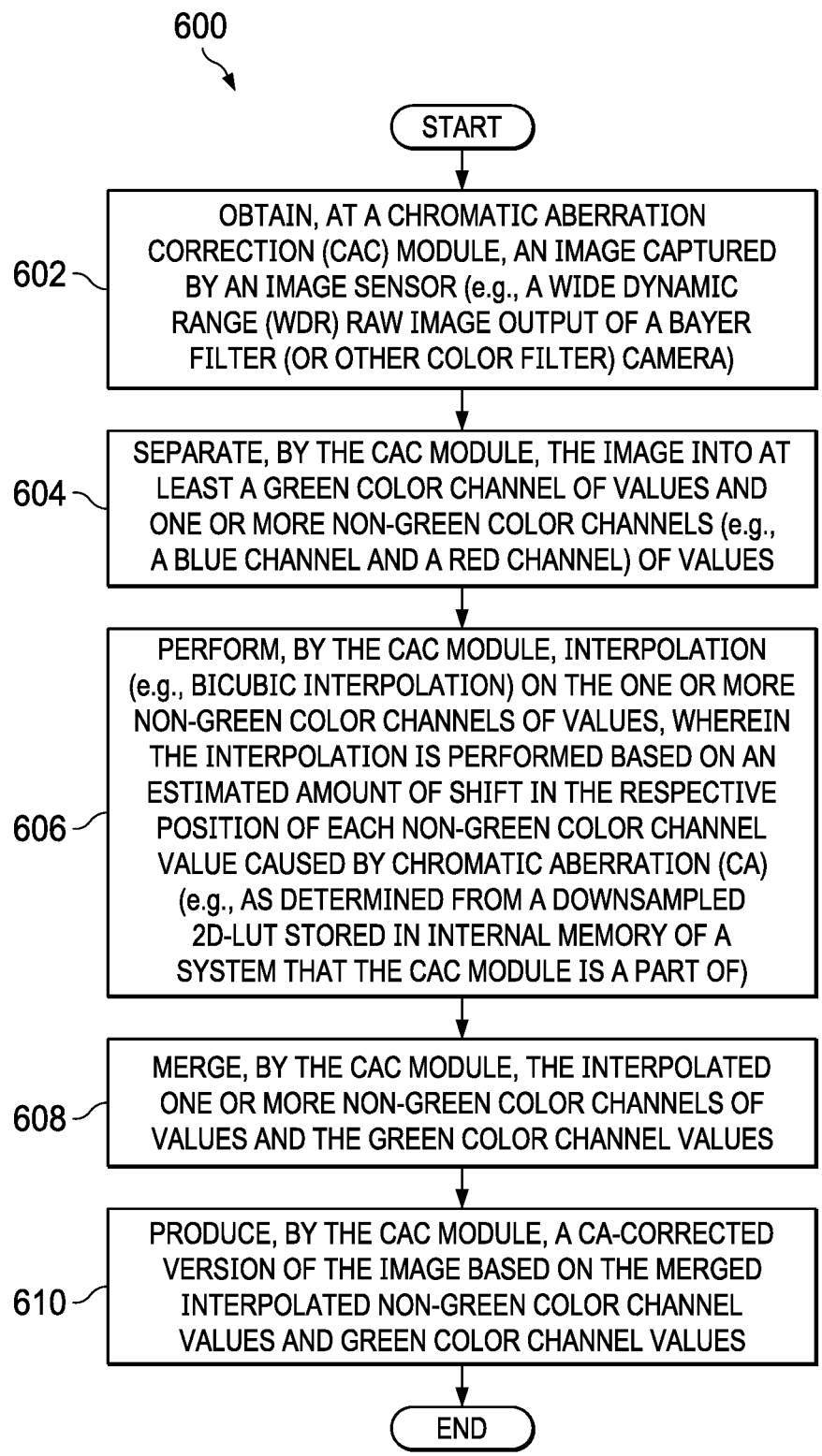
FIG. 6 is a flowchart illustrating a method for performing in-line CAC in a wide dynamic range (WDR) image processing pipeline, in accordance with aspects of the present disclosure.

Turning now to FIG. 6, a flowchart is shown, illustrating a method 600 for performing in-line CAC in a wide dynamic range (WDR) image processing pipeline, in accordance with aspects of the present disclosure. First, at Step 602, the method 600 may obtain, at a CAC module, an image captured by an image sensor, e.g., a WDR raw image output of a Bayer filter (or other type of color filter) camera. Next, at Step 604, the method 600 may separate, by using the CAC module, the image into at least a green color channel of values and one or more non-green color channels (e.g., a blue channel and a red channel) of values.

Next, at Step 606, the CAC module may perform an interpolation operation (e.g., a bicubic interpolation operation) on the one or more non-green color channels of values, wherein the interpolation is performed based on an estimated amount (and direction) of shift in the respective position of each non-green color channel value caused by the properties of the capturing lens and the predicted effects of LCA (e.g., as determined from a downsampled 2D-LUT stored in internal memory of a system that the CAC module is a part of). Next, at Step 608, the CAC module may merge the interpolated one or more non-green color channels of values and the green color channel values into a single line of CA-corrected image pixel color values (e.g., matching the pattern of the CFA with which the input image was originally captured).

Finally, at Step 610, the CAC module may produce a CA-corrected version of the image by combining all the lines of merged interpolated non-green color channel values and green color channel values (and performing any additional desired post-processing on the CA-corrected data). As described above, e.g., with reference to FIGS. 4 and 5, the disclosed techniques involve processing lines of input pixels as they are input to the CAC module 'on-the-fly,' buffering only the lines of input image pixels (and color channels thereof), as necessary, in internal buffer memory, i.e., until the CA-corrected (e.g., interpolated) and merged color values for each line of pixels may be output to the next module of the image processing pipeline, thereby allowing the method 600 to avoid any repeated accesses to main memory (e.g., random access memory) to read and/or write pixel values during the CAC process.

It is to be understood that, although the techniques disclosed herein have been described largely in the context of Bayer (i.e., RGGB) image sensors (wherein the green color channel does not need to be shifted) for ease of illustration, analogous techniques could be applied to image sensors having any desired type of CFA pattern (e.g., RYYB, RCCB, RCCC, RCCG, etc.), so long as the camera's lens is characterized sufficiently to allow for the estimation of shift vectors to compensate for the potential effects of CA in each respective color channel across the extent of the lens. As may now be appreciated, the greater the total number of pixels (e.g., in the form of one or more entire color channels of pixels) that may be separated and excluded from the shifting estimation and interpolation operations, the greater the benefit, in terms of reduced latency and increased memory savings, is that may be achieved by a given implementation.

In this description, the term "module" refers to any known or later developed hardware, software, firmware, artificial intelligence, fuzzy logic, or combination of hardware and software that is capable of performing the tasks or other operations associated with a given element of a system. A module may comprise a set of one or more circuits, one or more processors, and/or one or more microcontrollers, the electrical or data connections therebetween, as well as computer-executable instructions (e.g., software code or firmware) or specially-designed logic for causing the module to perform one or more tasks or other operations associated with the functionality of the module.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party. Circuits described herein are reconfigurable to include additional or different components to provide functionality at least partially similar to functionality available prior to the component replacement.

Unless otherwise stated, "about," "approximately," or "substantially" preceding a value means +/−10 percent of the stated value. Modifications are possible in the described examples and embodiments, and other examples and embodiments are possible within the scope of the claims.

What is claimed is:

1. An electronic device comprising:
    a color separator configured to separate an image into a first color component having a first set of pixels and second color component having a second set of pixels;
    a first cache memory coupled to the color separator, the first cache memory configured to store values of the first set of pixels;
    a second cache memory coupled to the color separator, the second cache memory configured to store values of the second set of pixels;
    an interpolator coupled to the second cache memory, the interpolator configured to perform interpolation on the values of the second set of pixels, wherein the interpolation is performed based on an estimated amount of shift in the respective position of each value of the second set of pixels caused by chromatic aberration (CA); and
    a circuit coupled to the first cache memory and the interpolator, the circuit configured to merge the interpolated values of the second set of pixels and values of the first set of pixels; and
    wherein the electronic device is configured to produce a CA-corrected version of the image based on the merged interpolated values of the second set of pixels and the values of the first set of pixels.

2. The electronic device of claim 1, wherein the electronic device further comprises a chromatic aberration correction (CAC) circuit that includes the color separator, the first and second cache memories, the interpolator, and the circuit.

3. The electronic device of claim 2, wherein the electronic device further comprises an image sensor coupled to the CAC circuit, the image sensor configured to capture a scene from an external environment and convert the captured scene into the image.

4. The electronic device of claim 1, wherein the interpolator is configured to estimate an amount of shift in the respective position of each value of the values of the second set of pixels caused by chromatic aberration (CA) using a two-dimensional (2D) look-up table (LUT) storing a plurality of pixel shift values.

5. The electronic device of claim 4, wherein the 2D LUT is capable of storing the plurality of pixel shift values at a plurality of different down-sampling factors with respect to a resolution of the image.

6. The electronic device of claim 1, wherein the first color component is green and the second color component is one of blue and red.

7. The electronic device of claim 1, wherein the image is a Wide Dynamic Range (WDR) image having a dynamic range of 16 or more bits.

8. The electronic device of claim 1, wherein the image is separated, interpolated, and merged on a pixel line-by-line basis.

9. An image processing pipeline comprising:
    an image processor configured to receive an input image and perform image processing on the input image to generate a formatted image;
    first circuitry coupled to the image processor, the first circuitry configured to separate the formatted image into a first color component having a first set of pixels and a second color component having a second set of pixels, perform interpolation on values of the second set of pixels based on an estimated amount of shift in the respective position of each value of the second set of pixels caused by chromatic aberration (CA), merge the interpolated values of the second set of pixels and values of the first set of pixels, and output a CA-corrected version of the formatted image based on the merged interpolated values of the second set of pixels and values of the first set of pixels;

second circuitry coupled to the first circuitry, the second circuitry configured to process the CA-corrected version of the formatted image to generate a processed image;

a first color processor directly coupled to the second circuitry and configured to generate a first color processed image based on the processed image;

a second color processor directly coupled to the first circuitry and configured to generate a second color processed image based on the CA-corrected version of the formatted image; and third circuitry directly coupled to each of the first color processor and the second color processor and configured to combine the first and second color processed image to generate an output image.

10. The image processing pipeline of claim 9, wherein the second circuitry includes a noise filter and a tone mapper to generate, as the processed image, a CA-corrected, noise-reduced, and tone-mapped image.

11. The image processing pipeline of claim 9, further comprising a statistics component coupled to the first circuitry.

12. The image processing pipeline of claim 9, wherein the image processing performed on the input image by the image processor includes converting image data of the input image to a 16-bit gamma-corrected format representing the formatted image.

13. The image processing pipeline of claim 9, further comprising a Wide Dynamic Range (WDR) image sensor configured to generate the input image.

14. The image processing pipeline of claim 13, wherein the input image is a WDR image having a dynamic range of 16 or more bits.

15. The image processing pipeline of claim 9, wherein, to perform the interpolation, the CAC first circuitry estimates an amount of shift in the respective position of each value of the values of the second set of pixels caused by chromatic aberration (CA) using a two-dimensional (2D) look-up table (LUT) storing a plurality of pixel shift values.

16. The image processing pipeline of claim 15, wherein the 2D LUT is capable of storing the plurality of pixel shift values at a plurality of different down-sampling factors with respect to a resolution of the input image.

17. The image processing pipeline of claim 9, wherein a set number of lines of pixels are buffered in an internal memory of the first circuitry for use in performing the interpolation.

18. The image processing pipeline of claim 9, wherein:
the first color processor is configured to process color image information for human vision applications to generate the first color processed image based on the processed image; and
the second color processor is configured to process color image information for machine vision applications to generate the second color processed image based on the CA-corrected version of the formatted image.

19. The image processing pipeline of claim 9, wherein the first color component is green and the second color component is one of blue and red.

* * * * *